US011462763B2

(12) United States Patent
Poirier et al.

(10) Patent No.: US 11,462,763 B2
(45) Date of Patent: Oct. 4, 2022

(54) AIRCRAFT FUEL CELLS SYSTEM

(71) Applicants: Airbus SAS, Blagnac (FR); Airbus Operations SAS, Toulouse (FR); Airbus Operations GmbH, Hamburg (DE)

(72) Inventors: Didier Poirier, Blagnac (FR); Guido Klewer, Hamburg (DE); Anthony Roux, Toulouse (FR); Olivier Raspati, Toulouse (FR); Matthieu Thomas, Toulouse (FR); Olivier Verseux, Toulouse (FR); Manuel Silvestre Salas, Taufkirchen (DE)

(73) Assignees: Airbus SAS, Blagnac (FR); Airbus Operations SAS, Toulouse (FR); Airbus Operations GmbH, Hamburg (DE)

(*) Notice: Subject to any disclaimer, the term of this patent is extended or adjusted under 35 U.S.C. 154(b) by 200 days.

(21) Appl. No.: 17/026,679

(22) Filed: Sep. 21, 2020

(65) Prior Publication Data

US 2021/0098810 A1     Apr. 1, 2021

(30) Foreign Application Priority Data

Sep. 27, 2019 (FR) ...................... 1910691

(51) Int. Cl.
*H01M 8/248* (2016.01)
*H01M 8/04089* (2016.01)
*H01M 8/249* (2016.01)

(52) U.S. Cl.
CPC ....... *H01M 8/248* (2013.01); *H01M 8/04104* (2013.01); *H01M 8/249* (2013.01); *H01M 2250/20* (2013.01)

(58) Field of Classification Search
CPC .. H01M 8/248; H01M 8/04104; H01M 8/249; H01M 2250/20
(Continued)

(56) References Cited

U.S. PATENT DOCUMENTS

2009/0017340 A1* 1/2009 Kirklin ............... H01M 8/0432
429/434
2017/0125831 A1* 5/2017 Gasner ............. H01M 8/04201
(Continued)

FOREIGN PATENT DOCUMENTS

DE      102016115789 A1   3/2018
FR      2904147 A1        1/2008

OTHER PUBLICATIONS

French Search Report; priority document.

*Primary Examiner* — James M Erwin
(74) *Attorney, Agent, or Firm* — Greer, Burns & Crain, Ltd.

(57) ABSTRACT

A system of fuel cells for an aircraft including a plurality of fuel cells, a hydrogen circuit, a cooling circuit and a first air circuit configured to supply oxygen to a first subset of fuel cells having at least two cells. The first air circuit includes an air flow restrictor at each fuel cell inlet of the first subset and configured to distribute the air between the fuel cells of the first subset, and an outlet valve connected to the outlet of the fuel cells of the first subset, the opening of the outlet valve being controlled by a computer as a function of an electrical power that is to be produced by the fuel cells of the first subset. The use of the same air circuit to supply oxygen to several fuel circuits makes it possible to limit the bulk of the fuel cells system.

7 Claims, 3 Drawing Sheets

(58) Field of Classification Search
USPC .......................................................... 429/443
See application file for complete search history.

(56) References Cited

U.S. PATENT DOCUMENTS

2019/0109331 A1\* 4/2019 Skala ................ H01M 8/04447
2019/0109338 A1\* 4/2019 Yamamori .............. B60L 58/33

\* cited by examiner

AIRCRAFT FUEL CELLS SYSTEM

CROSS-REFERENCES TO RELATED APPLICATIONS

This application claims the benefit of the French patent application No. 1910691 filed on Sep. 27, 2019, the entire disclosures of which are incorporated herein by way of reference.

FIELD OF THE INVENTION

The present invention relates to a system of fuel cells in an aircraft, the system comprising a plurality of fuel cells.

BACKGROUND OF THE INVENTION

A fuel cells system is able to generate electricity without emitting any emissions that are harmful to the environment. Such a system of cells is able to supply electrical power to multiple items of equipment on board an aircraft, e.g., the lighting, the ventilation, the aircraft propulsion system, etc.

For example, it is known practice to use a propulsion system comprising at least one fuel cell used to supply power to an electric motor and a propeller. Such a propulsion system generally comprises a plurality of fuel cells.

It is also known practice to associate with each fuel cell a collection of auxiliary equipment items ("BOP" which stands for "Balance of Plant") that allow the cells to operate. Each set of balance of plant equipment notably comprises an air circuit configured to supply the fuel cell with dioxygen, a hydrogen circuit configured to supply the fuel cell with dihydrogen and a cooling circuit.

Such sets of balance of plant equipment are bulky and cumbersome.

It is therefore desirable to alleviate these disadvantages of the prior art.

SUMMARY OF THE INVENTION

A system of fuel cells for an aircraft is described. The system comprises:
  a plurality of fuel cells,
  a hydrogen circuit which carries hydrogen towards the fuel cells,
  a cooling circuit which cools the fuel cells, and
  a first air circuit configured to supply oxygen to a first subset of fuel cells of the plurality of fuel cells. The first subset comprises at least two fuel cells. The first air circuit comprises:
  an air flow restrictor at the inlet to each of the fuel cells of the first subset and configured to distribute the air between the fuel cells of the first subset; and
  an outlet valve connected to the outlet of the fuel cells of the first subset, the opening of the outlet valve being controlled by a computer as a function of an electrical power that is to be produced by the fuel cells of the first subset.

According to one embodiment, the system further comprises a compressor configured to compress the ambient air and send it to the first air circuit.

According to one embodiment, the first air circuit is configured to supply air to the entirety of the plurality of fuel cells.

According to one embodiment, the system comprises a second air circuit identical to the first air circuit and configured to supply air to a second subset of at least two cells of the plurality of fuel cells, the second subset being distinct from the first subset.

According to one embodiment, the first and second air circuits are connected to the compressor in parallel.

According to one embodiment, the system further comprises an electric motor and a controller converting an electrical current delivered by the first subset of cells into an electrical current delivered to the electric motor.

Also described is an aircraft which comprises a fuel cell system according to one of the above embodiments.

BRIEF DESCRIPTION OF THE DRAWINGS

The abovementioned features of the invention, together with others, will become more clearly apparent from reading the following description of one exemplary embodiment, the description being given with reference to the attached drawings, among which.

DETAILED DESCRIPTION OF THE PREFERRED EMBODIMENTS

Figure 1:
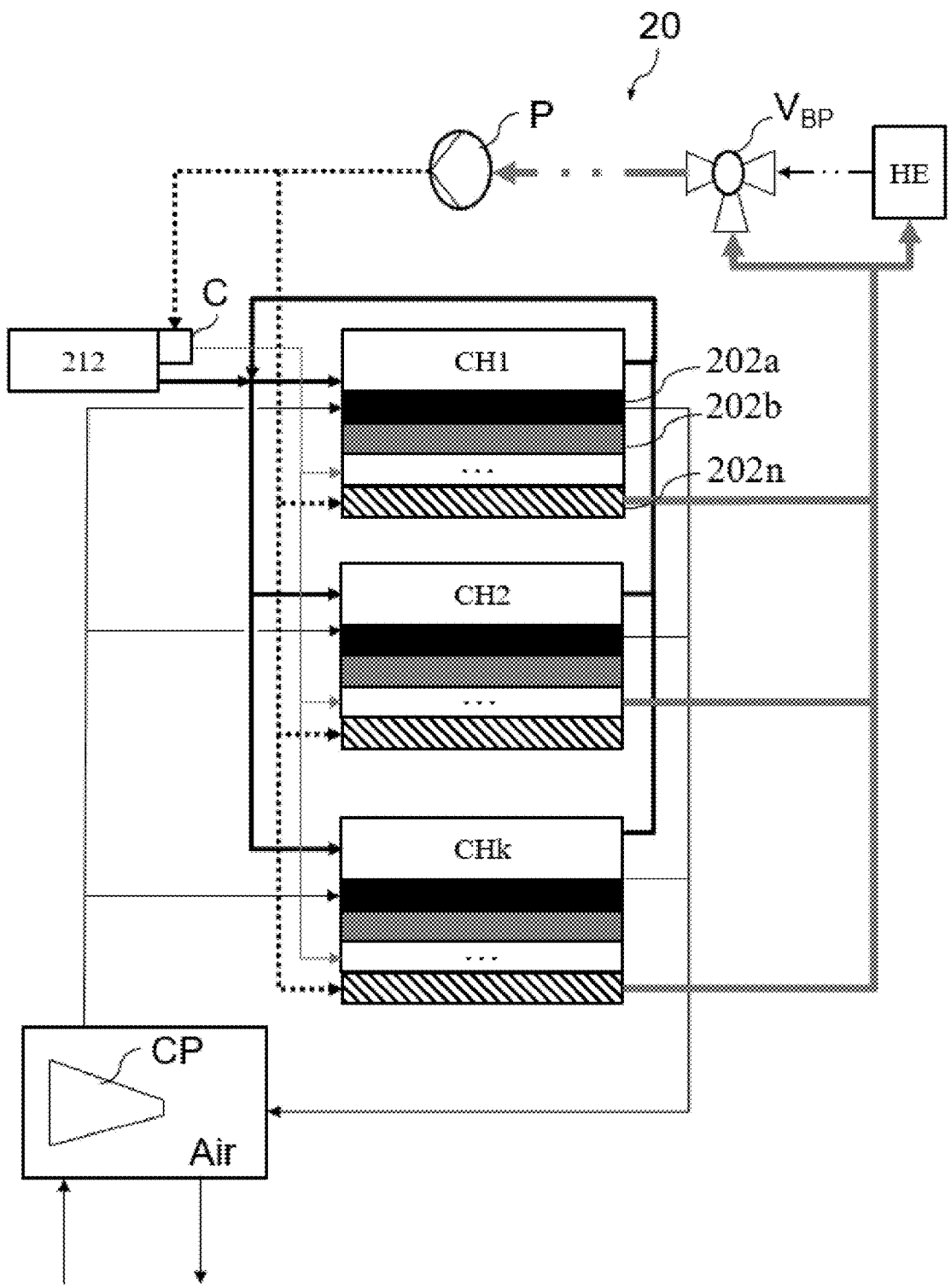
FIG. 1 is a schematic depiction of a system comprising a plurality of fuel cells according to one particular embodiment.

FIG. 1 is a schematic depiction of a system 20 comprising a plurality of fuel cells. The system illustrated in FIG. 1 may be used to supply electricity to an aircraft propulsion system. It may be used for purposes other than propulsion, e.g., for the lighting and/or ventilation of a passenger cabin, for supplying electrical power to flight warning systems, etc. In FIG. 1, the system 20 comprises a set of fuel cells which are distributed among k subsets CH1, CH2 . . . CHk of n cells each, k and n being integers. The k subsets CH1, CH2 . . . CHk are placed in parallel. For each subset, the n cells can be identified in FIG. 1 by a black rectangle (202a), by a grey rectangle (202b), . . . , and by a diagonally hatched rectangle (202n). The system 20 comprises a number n of fuel cells that is greater than or equal to two. According to one particular embodiment, the set of cells is coupled to an electric motor powered by the electricity produced by the cells and to a controller of the electric motor, neither of which are depicted in FIG. 1. According to a variant, each subset of cells CHx (x=1, 2, . . . , k) is coupled to an electric motor powered with the electricity produced by the cells of the subset of cells CHx via a controller of the electric motor.

The fuel cells 202a, 202b, . . . , 202n are cells in which an electrical voltage is generated by the oxidation of a reducing fuel, in this instance dihydrogen, on an anode, coupled with the reduction of an oxidant, in this instance the dihydrogen in the air, on a cathode. The two electrodes are in contact with a membrane, which acts as an electrolyte thus transporting the ions produced at the anode. Specifically, the oxidation of the dihydrogen at the anode produces H+ ions and electrodes e− which pass from the anode to the cathode. On arrival at the anode, the dihydrogen (H2) splits (oxidation) into H+ ions and electrodes according to the following reaction: 2H2=4H++4e−. The H+ ions migrate into the membrane as the electrons pass around an external circuit, thus producing electrical energy. At the cathode, the H+ ions, the electrodes e− and dihydrogen (e.g., coming from the air) meet to form water according to the following reaction: 4H++4e−+O2=2H2O. During this reaction, heat is released.

Hereinafter, the terms oxygen and dioxygen are used interchangeably. Likewise, the terms hydrogen and dihydrogen are used interchangeably.

The fuel cells are supplied with oxygen by an air circuit depicted in solid fine black line. The oxygen comes, for example, from the ambient air which is pressurized by at least one compressor CP, the compressed air being used to supply the subsets of cells CH1, CH2 . . . CHk. According to one particular embodiment, just one single compressor is used to supply all the subsets of cells with oxygen. The ambient air comes, for example, from one or more scoops. Oxygen not used by the fuel cells in the chemical reaction is discharged to outside the aircraft.

The fuel cells are also supplied with hydrogen via a hydrogen circuit depicted in thick solid black line. The hydrogen is stored, for example, in liquid form in a tank 212. The liquid hydrogen is vaporized by means of a capsule C which is in contact with the tank 212. The capsule is a hermetically sealed chamber in which a vacuum prevails that allows the pressure and temperature of the hydrogen in the hydrogen circuit to be regulated. Hydrogen not used by the fuel cells in the chemical reaction is returned to the hydrogen circuit.

The fuel cells are cooled by a cooling circuit. Specifically, the chemical reactions in the fuel cells produce heat which needs to be removed in order not to overheat the cells. For this purpose, they are supplied with liquid coolant at a first temperature (dotted black line) and with liquid coolant at a second temperature (fine solid grey line) lower than the first temperature. The liquid coolant is, for example, a mixture of water and of glycol, e.g., of the EGW (Ethylene Glycol Water) type. In the event that the system 20 comprises several subsets of cells placed in parallel as illustrated in FIG. 1, the outlets of the cooling circuits of the various subsets of cells are combined. These outlets are connected to the inlet of a heat exchanger HE so as to remove heat to outside the installation. They are also connected to the inlet of a bypass valve VBP (valve bypass). Thus, part of the liquid coolant is sent to the inlet of the heat exchanger HE and another part is sent directly to the valve VBP. The heat exchanger HE is supplied with fresh air from outside by one or more scoops on the exterior skin of the aircraft. The scoops may be distributed over the perimeter of the exterior skin and may for example be of the NACA type or of a type that lies flush with the exterior skin. By virtue of the fresh air passing through the heat exchanger HE, the liquid coolant coming from the fuel cells and circulating through the heat exchanger HE is cooled, while the fresh air is warmed. The heat exchanger HE therefore discharges the hot air to outside the aircraft, for example via a jet pipe.

According to one embodiment, the heat exchanger HE is positioned in a ram air duct of the aircraft. According to one particular embodiment, the heat exchanger HE is common to all the subsets of cells.

An outlet of the heat exchanger HE is connected to the inlet of the bypass valve VBP so as to send liquid coolant cooled by the heat exchanger HE into the cooling circuit. The bypass valve VBP is used to regulate the temperature at the inlet to the fuel cells. This valve VBP effectively makes it possible to vary the quantity of liquid coolant coming from the heat exchanger HE and sent into a cooling circuit. The valve VBP is therefore connected to a computer which, on the basis of measurements of the temperature of the liquid coolant at the inlet to the subset of cells, operates the valve and instructs it to increase or decrease the quantity of liquid coming from the heat exchanger HE on the basis of a target temperature, e.g., equal to a value slightly higher than 80° C. For that purpose, a temperature probe located downstream of the valve VBP is used to create a closed control loop for operating the valve. Specifically, at high altitude, the exterior temperatures may be very low. This is why only part of the liquid is cooled using the heat exchanger HE, and a hotter part is sent directly to the valve VBP. The liquid coolant leaving the valve VBP is used notably to vaporize the liquid hydrogen stored in the tank 212 by entering the capsule C. It must not therefore be excessively cold.

The outlet from the bypass valve VBP is connected to the inlet of a pump P.

The pump P is configured to cause the liquid coolant to circulate through the various elements (e.g., fuel cells, motor 204 and controller 208). The pump P is used to regulate the temperature at the outlet of the fuel cells by varying the flow rate of liquid coolant (hot and cold) sent to the inlet of the fuel cells.

The outlet of the pump P is connected to an inlet E1 of each of the subsets of cells CH1, CH2 . . . CHk. It is also connected to the inlet of the capsule C the outlet of which is connected to another inlet E2 of each of the subsets of cells CH1, CH2 . . . CHk. Thus, part of the liquid coolant leaving the pump P is sent directly to the inlet E1 of the subsets of cells and corresponds to a liquid referred to as hot. Another part of the liquid coolant passes through the capsule C. The liquid coolant passing through the capsule C is used to vaporize the hydrogen stored in the tank 212. The liquid coolant leaving the capsule C is therefore colder than that entering it. It is sent to the second inlet E2 of the subsets of cells and corresponds to a liquid referred to as cold.

Figure 2:
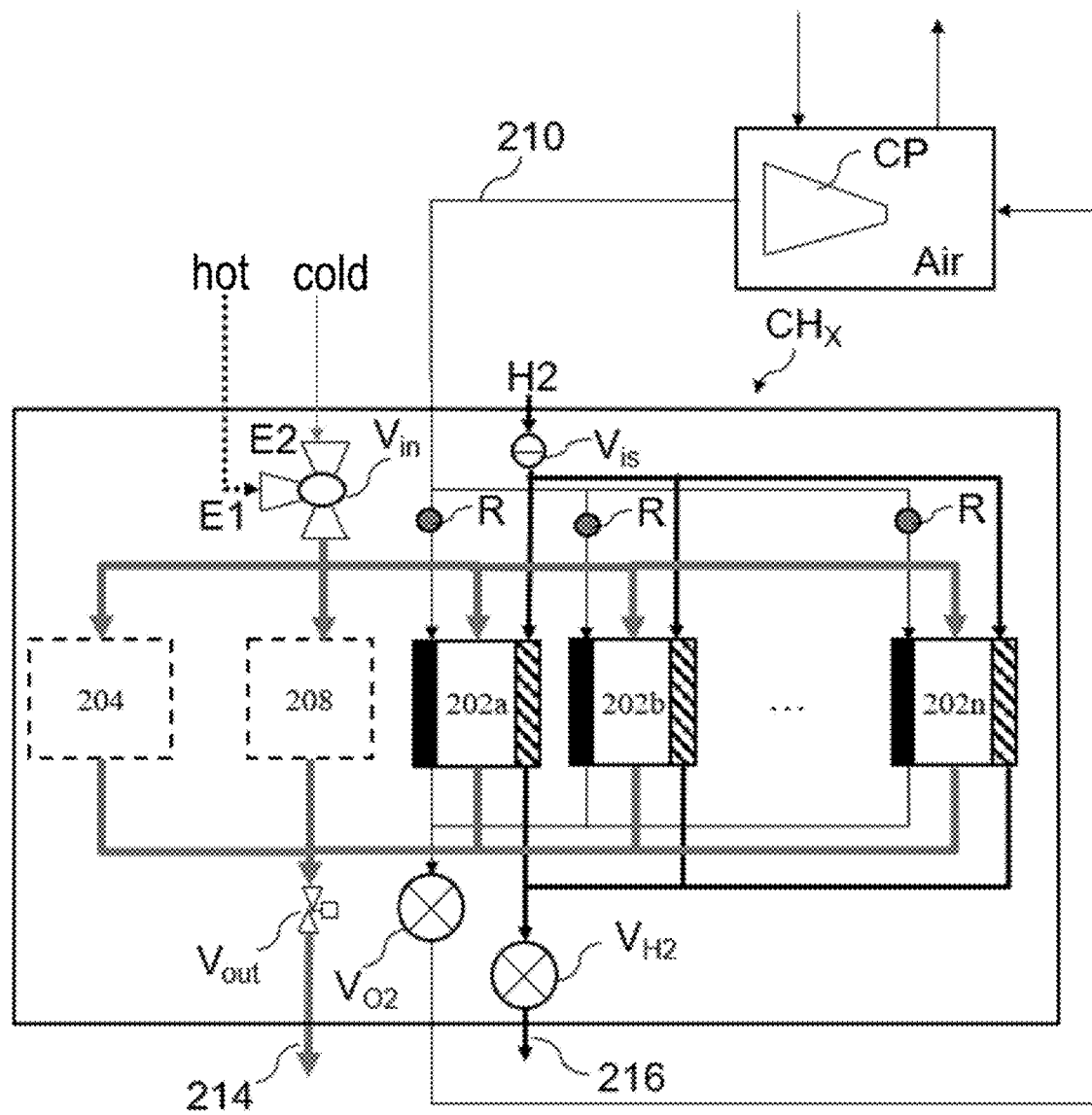
FIG. 2 is a schematic depiction of a set of fuel cells according to one particular embodiment.

FIG. 2 is a schematic depiction of one of the subsets of cells CHx, x=1, 2 . . . k of FIG. 1. In FIG. 2, the subset of cells CHx comprises n fuel cells. The subset of cells CHx comprises at least two fuel cells. In FIG. 2, the n fuel cells are coupled to an electric motor 204 supplied with electricity by the fuel cells of the subset CHx and to a controller 208. According to one embodiment, the controller 208 comprises an electric converter which converts a direct electric current delivered by the fuel cells into a direct or alternating electric current delivered to the electric motor 204. The conversion to direct or alternating electric current is dependent on the type of electric motor used. In a variant, the motor 204 and the controller 208 are external to the subset of cells CHx. In another variant, the electricity produced by the fuel cells is used to power an element other than the motor 204, e.g., the lighting of a passenger cabin.

In FIG. 2, the air circuit 210, hydrogen circuit 216 and cooling circuit 214 have been depicted using the same line styles as in FIG. 1.

The air entering the subset of cells is distributed between the various cells. To do this, the air circuit 210 comprises a flow restrictor R which is an element which creates a reduced pressure at the inlet of each cell that the circuit supplies with air. A concentric orifice plate is an example of such a flow restrictor R. These restrictors R allow the quantity of air to be distributed evenly between the cells. The restrictors R are configured so that the same quantity of air reaches the inlet of each of the cells. The restrictors R are notably designed to take account of the piping used upstream and downstream of the cells in the air circuit, and of the position of the cells within the subset of cells. The restrictors R are designed according to the geometry (length, number and nature of elbows) of the piping upstream and downstream of the cell. For example, in instances in which the restrictor R is an orifice plate, the shorter and less burdened with "obstacles" the line between the upstream and downstream junction points, the smaller will be the inside diameter of the established orifice in order to generate a higher pressure drop to compensate for the small pressure drop induced by the piping.

Valves VO2 and VH2 are positioned at the outlet of the air circuit 210 and hydrogen circuit 216. These valves make it possible to control the flows of air and, respectively, of hydrogen, passing through the cells. They are controlled by a computer. Specifically, according to the electrical power demanded of the subset of cells CHx, a certain quantity (mass flow) of hydrogen and a certain quantity of oxygen need to be supplied to the cells. These quantities are determined by the computer, taking account of the chemical reactions that take place at the anode and at the cathode and of the stoichiometric quantities of the air and hydrogen products participating in the reaction. The demands for electrical power may be different from one subset of cells to another, hence the benefit of controlling the quantities of hydrogen and of oxygen, subset of cells by subset of cells, using the valves VO2 and VH2.

According to one embodiment, the air circuit 210 (containing R and VO2) illustrated in FIG. 2 is common to at least two fuel cells of the plurality of fuel cells. According to one particular embodiment, the air circuit 210 is common to all the fuel cells of the one same subset of cells as illustrated in FIG. 2. In that case, the air circuit 210 is reproduced for each subset CHx of cells. In a variant, the air circuit 210 is common to all the fuel cells of all the subsets CHx of cells.

According to one embodiment, the outlet valve VO2 is common to at least two fuel cells of the plurality of fuel cells. According to one particular embodiment, the outlet valve VO2 is common to all the fuel sets of the same subset of cells, as illustrated in FIG. 2. This last variant allows the electrical power required to be adapted subset of cells by subset of cells. In another variant, the outlet valve is common to all the fuel cells of all the subsets of cells.

Having a single air circuit for a plurality of fuel cells allows a space saving, a reduction in the weight of the system, savings on manufacturing costs because there is less equipment to be purchased. Furthermore, having a single air circuit also makes it possible to reduce the complexity of the system for the air lines. Servicing it therefore becomes simpler. The computer that control the system are less expensive because of the reduction in the number of inputs (sensors) and outputs (valves and pumps) they have to manage.

A fuel cell, in addition to generating an electrical voltage, produces heat that needs to be removed. For this purpose, the subset of cells CHx comprises a cooling circuit depicted in thick grey solid line. The cooling circuit comprises a first inlet E1 at which the liquid coolant arrives at the first temperature (referred to as hot liquid) and a second inlet E2 at which the liquid coolant arrives at the second temperature (referred to as cold liquid), the second temperature being lower than the first temperature. The cooling circuit comprises a device Vin configured to mix the hot liquid and the cold liquid in order to obtain the liquid coolant at a target temperature. To do that, the temperature at the outlet of the device Vin may be measured and transmitted to a computer (not depicted in FIG. 2). On the basis of a discrepancy between the measured temperature value and a setpoint value, the computer will operate the device Vin. The setpoint value is equal for example to 80° C. Thus, if the measured temperature is higher than the setpoint temperature, then the computer instructs the device Vin to increase the quantity of cold liquid in the mixture until the setpoint temperature is reached. On the other hand, if the measured temperature is lower than the setpoint temperature, then the computer instructs the device Vin to increase the quantity of hot liquid in the mixture. The liquid coolant thus obtained is then distributed between the various elements it has to feed, e.g., the various cells and, where appropriate, the motor 204 and the controller 208.

The liquid coolant leaving the various elements (i.e., at the outlet of the various cells and, where appropriate, of the motor 204 and of the controller 208) is therefore hotter than at the inlet to these elements. In order to regulate the temperature at the outlet of the subset of cells CHx, the cooling circuit comprises an outlet valve Vout, which is controlled by a computer to regulate the temperature of the liquid coolant at the outlet of the subset of cells CHx. When the temperature measured at the outlet increases, the computer sends an instruction to the outlet valve Vout to make it increase its degree of opening in order to increase the flow rate of the liquid coolant and thus obtain better temperature regulation.

Note that the subset of cells CHx may comprise other elements, not depicted in FIG. 2. As an option, the subset of cells CHx may comprise an isolation valve Vis at the inlet of the hydrogen circuit. The isolation valve Vis allows the subset of cells CHx to be isolated from the other subsets of cells, notably in the event of a hydrogen leak. The subset of cells CHx can also comprise a module (not depicted in FIG. 2) for measuring the differential pressure between the air intake and the hydrogen intake in order to control and, where appropriate, to limit, the difference in pressure between the two gasses across the membrane.

The one same single computer can be used to operate all of the valves and the pump. In a variant, different computers are used.

The subsets of fuel cells in FIGS. 1 and 2 are advantageously coupled with an electrical-energy storage system comprising batteries and/or capacitors.

The subsets of fuel cells in FIGS. 1 and 2 are advantageously used by an aircraft propulsion system.

Figure 3:
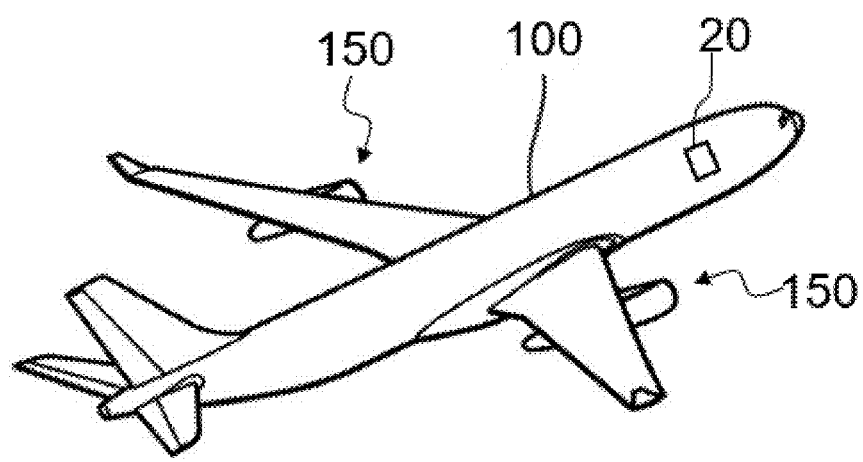
FIG. 3 is a perspective view of an aircraft comprising a plurality of propulsion systems according to one particular embodiment.

FIG. 3 is a perspective view of an aircraft 100 which has a fuselage on each side of which a wing is attached. Attached beneath each wing is at least one propulsion system 150. In FIG. 3, the propulsion systems 150 are placed beneath the wing, but in another embodiment, they may be on top of the wing. The aircraft comprises at least one system 20 as abovementioned, comprising a plurality of fuel cells. According to a first embodiment, this system 20 is used to supply electricity to an aircraft propulsion system 150. According to a second embodiment, the system 20 is used to electrically power non-propulsive systems of the aircraft (for example: computers, actuators, electrical converters, etc.).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system of fuel cells for an aircraft, comprising:
a plurality of fuel cells,
a hydrogen circuit which carries hydrogen towards the fuel cells,
a cooling circuit which cools said fuel cells, and
a first air circuit configured to supply oxygen to a first subset of fuel cells of said plurality of fuel cells, said first subset comprising at least two fuel cells, said first air circuit comprising:
an air flow restrictor at an inlet to each of said at least two fuel cells of said first subset and configured to distribute air between said at least two fuel cells of said first subset; and
an outlet valve connected to an outlet of said at least two fuel cells of said first subset, the opening of said outlet valve being controlled by a computer as a function of an electrical power that is to be produced by said at least two fuel cells of said first subset.

2. The system according to claim 1, further comprising a compressor configured to compress ambient air and send the ambient air to said first air circuit.

3. The system according to claim 1, wherein said first air circuit is configured to supply air to an entirety of said plurality of fuel cells.

4. The system according to claim 1, comprising a second air circuit identical to said first air circuit and configured to supply air to a second subset of at least two fuel cells of said plurality of fuel cells, said second subset being distinct from said first subset.

5. The system according to claim 4, further comprising a compressor configured to compress ambient air and send the ambient air to said first air circuit, wherein said first and second air circuits are connected to said compressor in parallel.

6. The system according to claim 1, further comprising an electric motor and a controller converting an electrical current delivered by said first subset of cells into an electrical current delivered to the electric motor.

7. An aircraft comprising a system of fuel cells according to claim 1.

* * * * *